United States Patent [19]

Matsukawa

[11] Patent Number: 5,448,321
[45] Date of Patent: Sep. 5, 1995

[54] MAGNETIC RECORDING APPARATUS FOR A CAMERA

[75] Inventor: Nobuo Matsukawa, Tokyo, Japan
[73] Assignee: Nikon Corporation, Tokyo, Japan
[21] Appl. No.: 368,398
[22] Filed: Jan. 3, 1995

Related U.S. Application Data

[63] Continuation of Ser. No. 134,544, Oct. 12, 1993, abandoned.

[30] Foreign Application Priority Data

Oct. 14, 1992 [JP] Japan ............................... 4-275619

[51] Int. Cl.⁶ ............................................ G03B 17/24
[52] U.S. Cl. .................................................. 354/106
[58] Field of Search .................... 354/106, 105; 360/1, 360/3, 105, 106, 107, 109

[56] References Cited

U.S. PATENT DOCUMENTS 5,272,498 12/1993 Wakabayashi ....................... 354/105
5,353,078 10/1994 Aoshima ............................... 354/105

FOREIGN PATENT DOCUMENTS 4-328535 11/1992 Japan .
5-158136 6/1993 Japan .

*Primary Examiner*—Howard B. Blankenship
*Attorney, Agent, or Firm*—Shapiro and Shapiro

[57] ABSTRACT

A recording apparatus for a camera using a photographic film bearing a magnetic recording medium comprises a magnetic head capable of assuming a recording position with the magnetic head pressed to the film and a retracted position with the magnetic head away from the film. When the magnetic head is at the recording position, a reference pin engages an edge of the film. To move the magnetic head to the retracted position, a drive mechanism moves the magnetic head in a direction along the film width, thereby disengaging the reference pin from the edge of the film, and then moves the magnetic head in a direction away from the film plane.

10 Claims, 5 Drawing Sheets

MAGNETIC RECORDING APPARATUS FOR A CAMERA

This is a continuation of application Ser. No. 08/134,544 filed Oct. 12, 1993, now abandoned.

BACKGROUND OF THE INVENTION

1. Field of the Invention

The present invention relates to a drive mechanism for a magnetic recording head for a camera which uses a silver salt film bearing a magnetic recording medium.

2. Related Background Art

A system comprising a film having a magnetic track provided thereon in addition to an optical image recording area and a camera for using it has been recently proposed. It is intended to read film information (such as a film sensitivity and a photographed frame count) which has been prerecorded on a magnetic track into a control circuit of a camera and write photographing information (such as a diaphragm value and a shutter speed) onto the magnetic track.

In this system, a magnetic head arranged on the camera is pressed to the magnetic track of the film, but since a load to feed the film is high if the film is fed while the magnetic head is pressed to the film, it has been proposed to retract the magnetic head from the film surface when it does not record the information.

In order to prevent positional offset of the magnetic head relative to the width of the magnetic track, it has also been proposed to provide a reference member which is substantially integral with the magnetic head and apply a biasing force to continuously abut the reference member against a film edge so that the magnetic head follows even if the film shifts widthwise, to prevent the offset from the magnetic track.

However, in this mechanism, if the film is retracted from the pressed position to the film when the film is to be fed, the position of the magnetic head may be shifted due to the widthwise shift of the film under feeding. Since the reference member is biased to abut against the film edge, the reference member interferes with the film surface when the magnetic head is to be moved into the pressed position after the magnetic head has been retracted so that the reference member has been away from the film edge. Thus, the movement of the magnetic head is impeded.

In order to prevent this problem, it may be possible to make the reference member sufficiently long to assure that it does not leave the film edge even when the magnetic head is in the retracted position, but this is not preferable because the biasing force which is continuously applied to the film edge from the reference member acts as a load in feeding the film.

SUMMARY OF THE INVENTION

In accordance with the present invention, the movement of the recording head between the recording position at which the recording head is pressed to the film and the retracted position is carried out by movement which is away from the film plane and movement along the film width.

When the magnetic head is to be moved from the recording position to the retracted position, it is first moved outwardly in a direction the film width so that a reference member is disengaged from the film edge, and then it is moved away from to the film plane to retract. On the other hand, when the magnetic head is to be moved from the retracted position to the recording position, it is first moved toward to the film plane to contact the film and then it is moved inwardly along the film width direction to engage with the film edge the reference member.

DETAILED DESCRIPTION OF THE PREFERRED EMBODIMENTS

Figure 1:
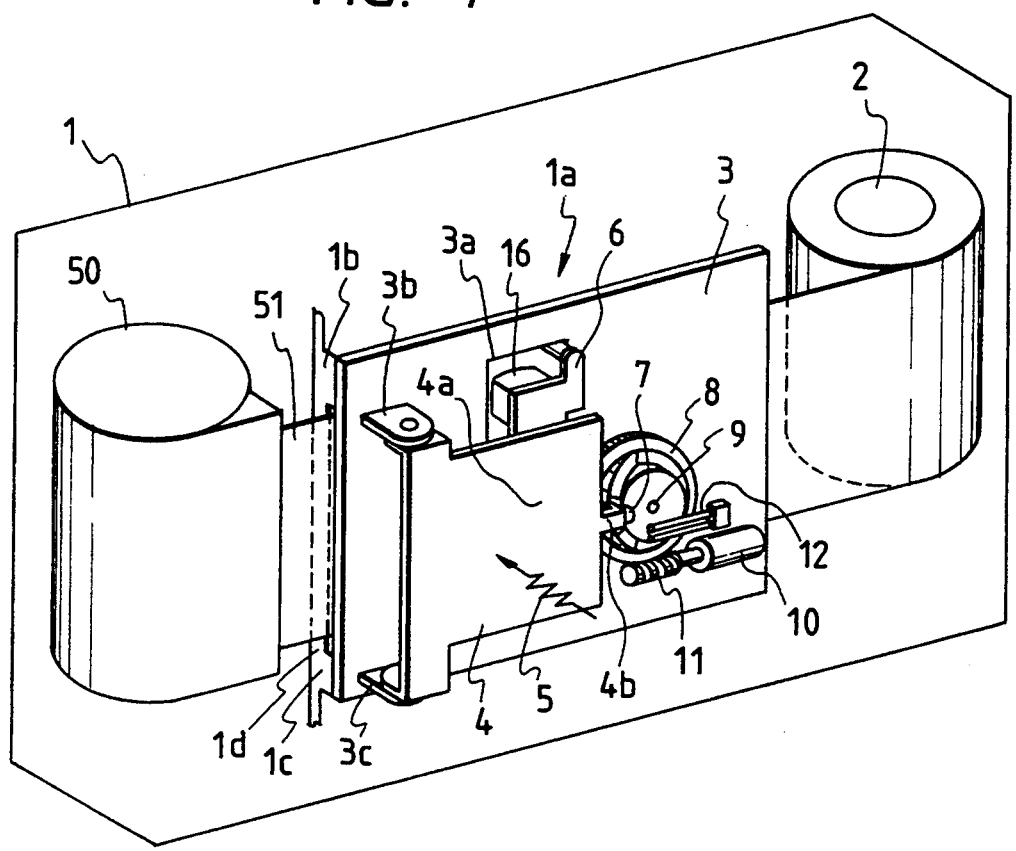
FIG. 1 shows a perspective view of an embodiment of the present invention.
Figure 10:
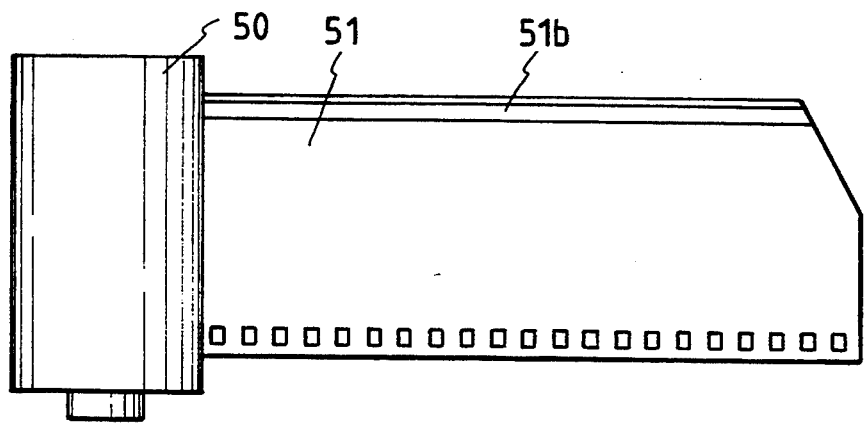
FIG. 10 shows a front view of a film and a cartridge pertinent to the present invention.

FIG. 1 shows a schematic diagram of an embodiment of the present invention. A film 51 of a cartridge 50 loaded in a camera body 1 is wound up onto a spool 2. The winding operation is carried out by a known powered winding device and the rewinding operation of the film into the cartridge 50 after the completion of the photographing is also carried out by a known rewinding device. The film 51 has a magnetic track 51b provided on one edge of a rear surface thereof as shown in FIG. 10 so that magnetic information may be recorded thereon by a magnetic head to be described later. FIG. 1 shows a retracted position of the magnetic head 16.

A base plate 3 which covers an aperture (not shown) is fixed in an intermediate area 1a between the cartridge 50 and the spool 2. Aperture peripheries 1b, 1c and the base plate 3 form a film path to direct the film 51 into an exposure position. A hole 3a is formed in the base plate 3 at a position facing the magnetic head 16 so that the magnetic head 16 can be pressed to the film 51.

A rotary base plate 4 is rotatably pivoted to bearings 3b and 3c of the base plate 3 and it is biased counterclockwise by an actuation device 5. A slidable plate 6 is mounted at a center portion 4a of the plate 4 and a roller 7 is fixed to an end 4b of the plate N. A cam plate 8 is a worm wheel gear rotatably pivoted to a shaft 9 on the base plate 3. It meshes with a worm gear 11 fixed to the shaft of a motor 10 and is driven counterclockwise at a reduced speed by the power of the motor 10. A brush 12 is fixed to the base plate 3 and detects a phase of the cam plate 8 as will be described later.

Figure 2:
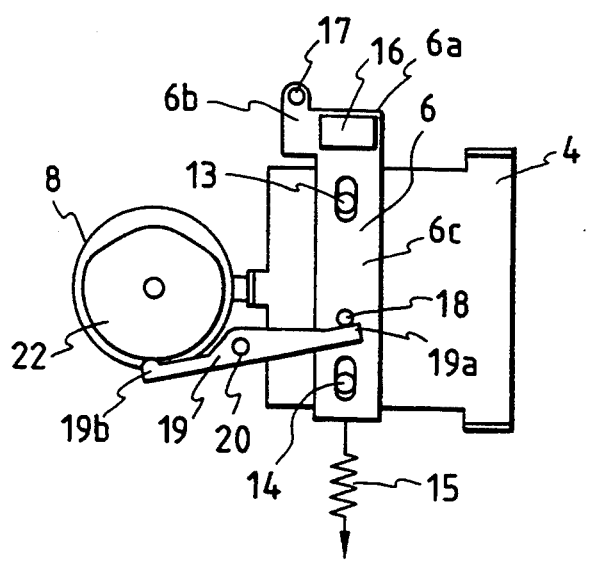
FIG. 2 shows a front view of a portion of the embodiment of the present invention.

FIG. 2 shows a rear side of the rotary base plate 4, as viewed from the film position. The slide plate 6 is slidably mounted on to the rotary base plate 4 by shafts 13 and 14 and is biased downwardly by an actuation member 15. The magnetic head 16 is fixed to a top 6a thereof and a reference pin 17 is fixed to an end 6b. A fixed pin 18 is fixed at a central portion 6c.

A lever 19 is rotatably pivoted to a shaft 20 on the base plate 3. A right end 19a thereof engages with the fixed pin 18 and a left end 19b thereof engages with a second cam 22 of the cam plate 8.

Figure 3:
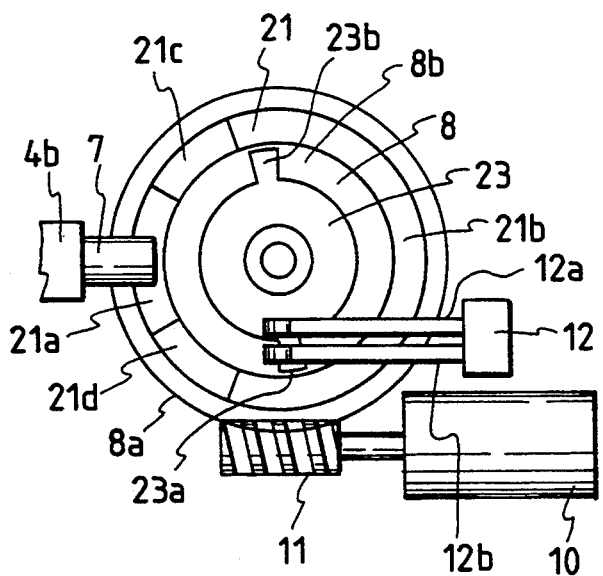
FIG. 3 shows a cam plate of the embodiment.
Figure 4:
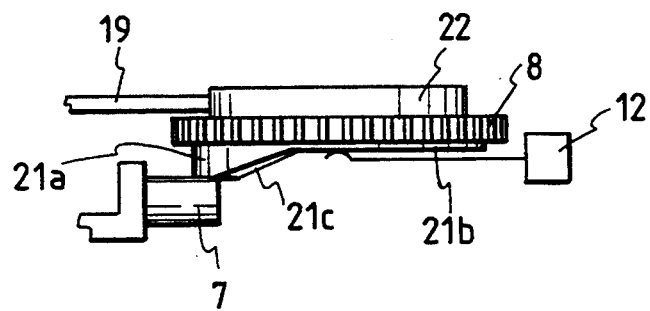
FIG. 4 shows a side view of the cam plate of the embodiment.
Figure 5:
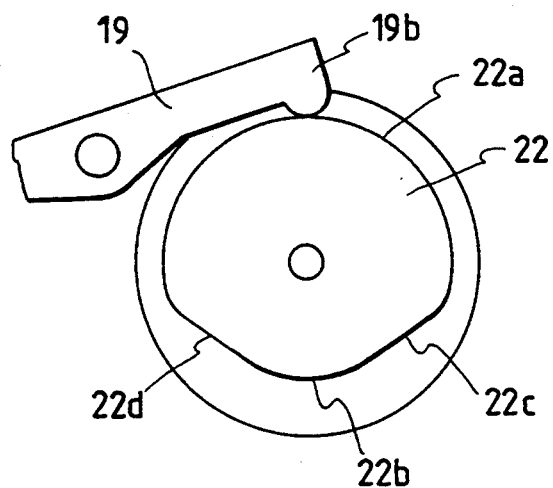
FIG. 5 shows a rear view of the cam plate of the embodiment.

FIGS. 3, 4 and 5 show the cam plate 8 and the members engaging therewith. FIG. 3 shows a front view of the cam plate 8. An outer periphery 8a thereof is a worm wheel gear which meshes with the worm gear 11. A first cam 21 having an axial level step is provided at the intermediate area. The first cam 21 has a high area 21a, a low area 21b and intermediate areas 21c and 21d connecting the areas 21 and 21b. Conductive patterns 23a and 23b are arranged at an interval of 180 degrees at a center 8b. The brush 12 abuts against the patterns to connect and disconnect the two brush parts 12a and 12b. FIG. 3 shows a conducting position.

FIG. 4 shows a side view of the cam plate 8 showing the high area 21a, the low area 21b and the sloped area 21c of the first cam 21.

FIG. 5 shows the second cam 22 on the rear of the cam plate 8. The second cam 22 has a high area 22a which is a portion of a circumference, a low area 22b of a smaller diameter and intermediate areas 22c and 22d connecting the areas 22a and 22b.

Phases of the first cam 21 and the second cam 22 are set as follows. In FIG. 3, the roller 7 is mounted on the high area 21a of the first cam 21 and the lever 19 is mounted on the high area 22a of the second cam 22 as shown in FIG 5. As the cam plate 8 is rotated clockwise from that position, the lever 19 is on the high area 22a until the roller 7 reaches the low area 21b. After one half revolution, the roller 7 stays in the low area 21b and the lever 19 also reaches the low area 22b. As the cam plate 8 is further rotated, the lever 19 first reaches the high area 22a and then the roller 7 mounts on the high area 21a from the low area 21b to complete one revolution.

Figure 11:
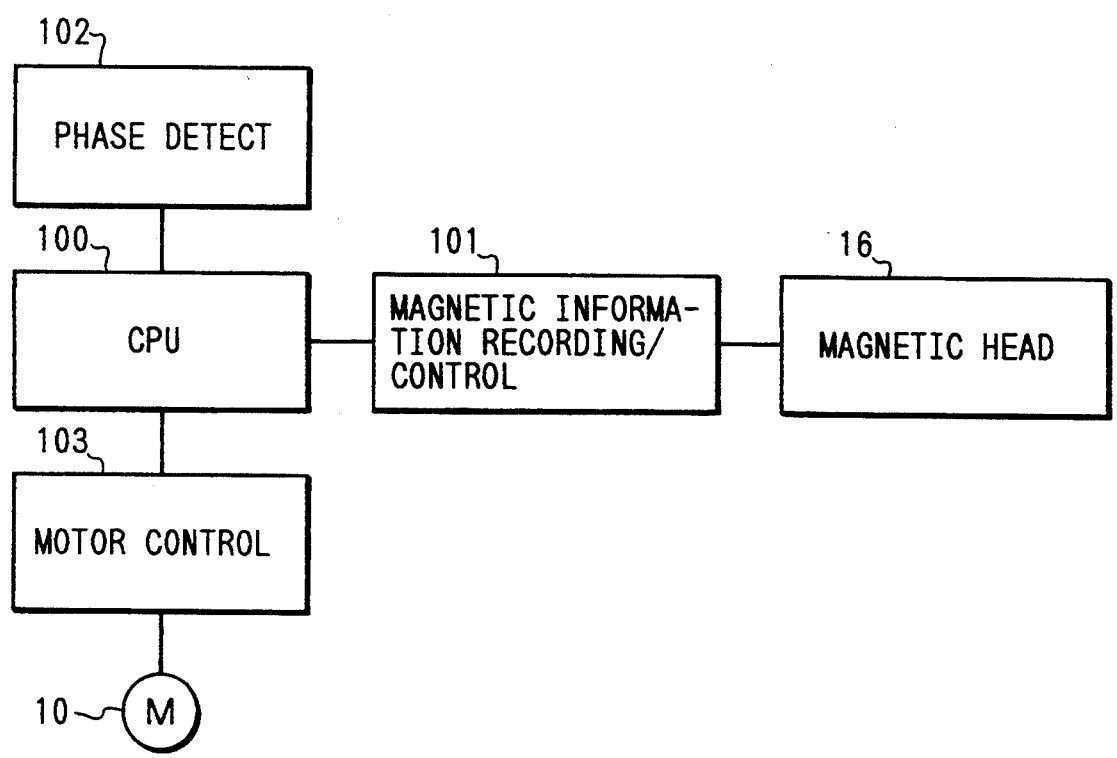
FIG. 11 shows a block diagram of the embodiment of the present invention.

FIG. 11 shows a block diagram for the control which comprises a CPU 100, a magnetic information recording control unit 101, a magnetic head 16, a phase detector 102, a motor 10 and a motor control unit 103. The phase detector 102 includes the brush 12, and the conductive patterns 23a, 23b and 23. Other known blocks relating to the film feed control and the exposure control are omitted.

Figure 6:
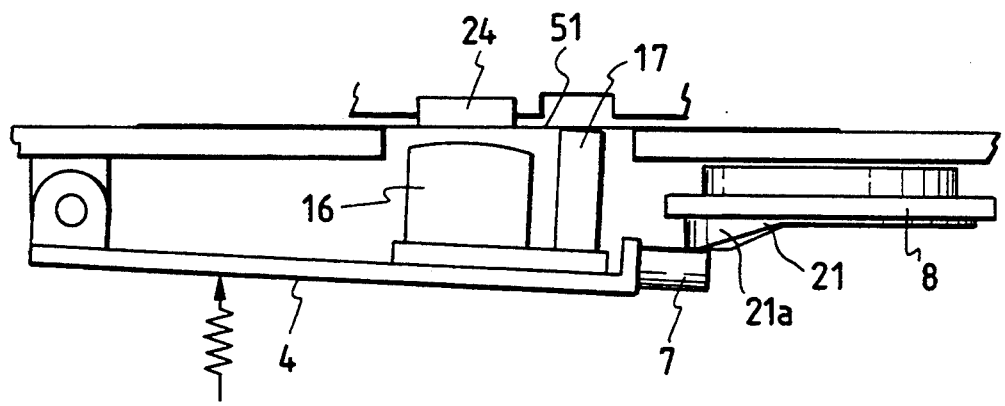
FIG. 6 shows a side view of a magnetic head of the embodiment in a retracted position.

An operation of the present embodiment is now explained. FIG. 1 shows the retracted position of the magnetic head 16 as described above. FIG. 6 shows a top view of the rotary base plate 4 and the cam plate 8. The roller 7 is mounted on the high area 21a of first cam 21 so that the magnetic head 16 floats from the film 51.

Figure 7:
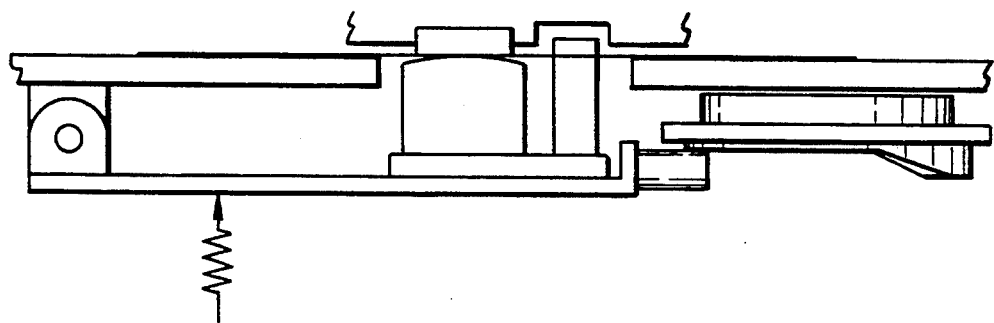
FIG. 7 shows a side view of the magnetic head of the embodiment in an abutment position.

When the recording of the magnetic information is desired and the control circuit issues a signal to command the pressing of the magnetic head 16, the motor 10 is driven, the cam plate 8 is rotated by one half revolution and it is stopped when the brush 12 is contracted by the conductive pattern 23. In this stroke, the roller 7 first falls to the lower area 21b of the first cam 21 so that the rotary base plate which is biased counterclockwise as shown in FIG. 7 follows it. The magnetic head 16 presses the film 51 before the roller 7 falls in the lower area 21b, so the magnetic head 16 is pressed with a constant force by the biasing of the rotary base plate 4. Numeral 24 denotes a pad fixed to the body 1.

Figure 8:
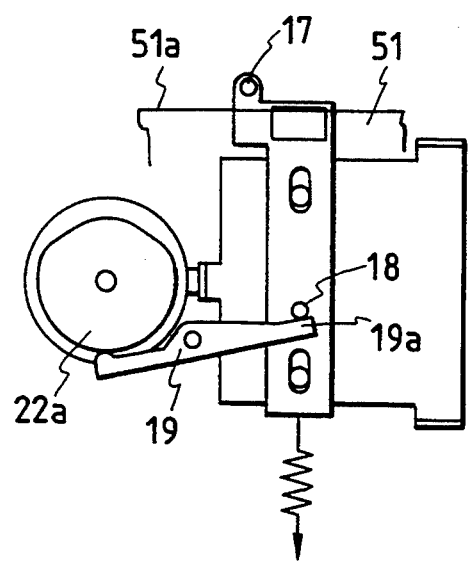
FIG. 8 shows a front view of the magnetic head of the embodiment in the retracted position.

The position of the second cam 22 and the lever 19 so far is shown in FIG. 8. Since the lever 19 is still on the high area 22a of the second cam 22, the right end 19a of the lever 19 acts as a limit to the fixed pin 18 and the reference pin 17 is kept floated from the film edge 51a.

Figure 9:
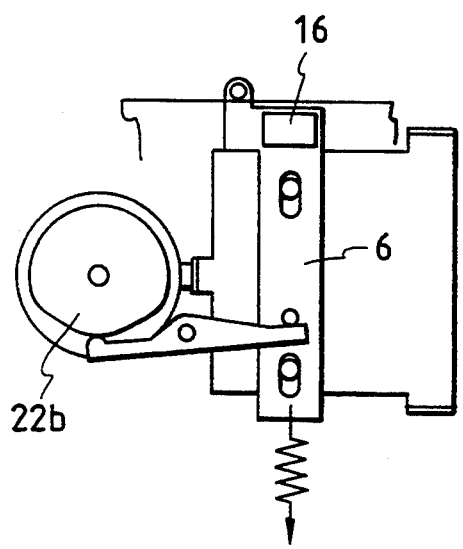
FIG. 9 shows a front view of the magnetic head of the embodiment in the abutment position.

In the next half of the rotation of the cam plate 8, the lever 19 falls in the lower area 22b of the second cam 22 as shown in FIG. 9 so that the slide plate 6 which is biased downwardly is moved downwardly until the reference pin 17 abuts against the edge 51a of the film to vertically position the magnetic head 16. By the biasing to the slide plate 6, the magnetic head 16 is positioned to the magnetic track 51b with a constant force.

When the magnetic head 16 is to be retracted and the control circuit issues a signal to command the retraction of the magnetic head 16, the motor 10 is driven and the cam plate 8 is rotated by another half revolution. When the brush 12 is contracted by the conductive pattern 23, the motor 10 is stopped. In this stroke, the opposite operation to that described above is carried out. Namely, since the lever 19 is mounted on the high area 22a of the second cam 22, the lever 19 is rotated counterclockwise and the right end 19a thereof lifts slide plate 6 through the fixed pin 18 to move the reference pin 17 away from the film edge 51a. Then, in the next stroke the roller 7 mounts on the high area 21a of the cam 21 so that the rotary base plate 4 is rotated clockwise against the biasing force and the magnetic head 16 is moved away from the film plane.

In the present embodiment, a plurality of strokes are carried out by unidirectional rotation of the motor, although a similar operation may be attained by a forward-reverse rotation. While the positioning and retraction of the magnetic head are carried out in one half revolution in the present embodiment, they may be attained in a smaller revolution.

As to the drive source of the head, instead of a separate motor arranged on the same base plate as that for the magnetic head in the present embodiment, another motor in the body, such as a film feed motor, may be used or the cam plate may be directly driven as a rotor of a stepping motor.

While the head is a record-only head in the present embodiment, it may be a recording and reproducing head.

In accordance with the present invention, when the magnetic head is to be pressed to the film, the magnetic head is first pressed to the film while the reference pin which abuts against the film edge is kept off the edge along the width of the film and then is moved inwardly along the width. Accordingly, the abutment of the reference pin, which is to contact to the film edge, against the film plane to disable the pressing of the magnetic head is prevented.

What is claimed is:

1. A recording apparatus for a camera adapted to have a photographic film bearing a magnetic recording medium loaded therein for recording information on said magnetic recording medium, comprising:

a magnetic head capable of assuming a recording position for recording information on said recording medium while pressed to said film and a retracted position at which the pressing to said film is released;

a reference member movable with said magnetic head and adapted to engage an edge of said film when the magnetic head is in the recording position; and a drive mechanism which moves said magnetic head in a film width direction to disengage said reference member from said film edge and which moves said magnetic head in a direction away from a plane of said film to drive said magnetic head between said recording position and said retracted position.

2. A recording apparatus for a camera according to claim 1 wherein said drive mechanism includes a first support mechanism for supporting said magnetic head to allow the movement in the direction away from the film plane, a second support mechanism for supporting said magnetic head to allow the movement along the film width direction, a motor, and a rotary member rotated by said motor, and said rotary member includes a first cam member for driving said magnetic head by said first support mechanism and a second cam member for driving said magnetic head by said second support mechanism.

3. A magnetic recording apparatus for a camera according to claim 2 wherein said magnetic head is moved in the direction away from the film plane by a first range of rotation of said rotary member and said magnetic head is moved in the direction along the film width by a second range of rotation of said rotary member.

4. A recording apparatus for a camera using a photographic film bearing a magnetic recording medium thereon, comprising:
- a magnetic head capable of assuming a recording position at which the magnetic head is pressed to said film and a retracted position at which the magnetic head is not pressed to the film;
- a support assembly including a first support member on which said magnetic head is mounted and a second support member on which said first support member is mounted, said second support member being movable toward and away from a plane of said film, and said first support member being movable relative to said second support member along a width direction of said film;
- a reference member mounted on said first support member for movement toward and away from an edge of said film; and
- a drive mechanism for driving said magnetic head between said recording position and said retracted position, said drive mechanism driving said magnetic head from said recording position to said retracted position by moving said first support member in said film width direction to disengage said reference member from said film edge and then moving said second support member in a direction to move said magnetic head away from said film plane, said drive mechanism driving said magnetic head from said retracted position to said recording position by moving said second support member in a direction to press said magnetic head against said film and then moving said first support member in a direction to engage said reference member with said film edge.

5. A recording apparatus for a camera adapted to form an image of a field to be photographed on a predetermined plane and expose a film bearing a magnetic recording medium loaded in the camera to the image, comprising:
- a magnetic head capable of assuming a recording position for recording information on said recording medium while pressed to said film and a retracted position at which the pressing to said film is released; and
- a drive mechanism for moving said magnetic head between the recording position and the retracted position, said drive mechanism moving said magnetic head in a first direction from said retracted position to a predetermined position at which the magnetic head is pressed to said film, and thereafter moving said magnetic head in a second direction extending along said predetermined plane to said recording position.

6. A recording apparatus for a camera according to claim 5 wherein said drive mechanism includes a first support mechanism for supporting said magnetic head to allow the movement in said first direction, a second support mechanism for supporting said magnetic head to allow the movement in said second direction, a motor, and a rotary member rotated by said motor, and said rotary member includes a first cam member for driving said magnetic head by said first support mechanism and a second cam member for driving said magnetic head by said second support mechanism.

7. A magnetic recording apparatus for a camera according to claim 6 wherein said magnetic head is driven in said first direction by a first range of rotation of said rotary member and said magnetic head is driven in said second direction by a second range of rotation of said rotary member.

8. A recording apparatus adapted to have a photographic film bearing a magnetic recording medium loaded therein for recording information on said magnetic recording medium, comprising:
- a magnetic head capable of assuming a recording position for recording information on said recording medium while pressed to said film and a retracted position at which the pressing to said film is released;
- a reference member movable with said magnetic head and adapted to engage an edge of said film when the magnetic head is in the recording position; and
- a drive mechanism which moves said magnetic head in a film width direction to disengage said reference member from said film edge and which moves said magnetic head in a direction away from a plane of said film to drive said magnetic head between said recording position and said retracted position.

9. A recording apparatus using a photographing film bearing a magnetic recording medium thereon, comprising:
- a magnetic head capable of assuming a recording position at which the magnetic head is pressed to said film and a retracted position at which the magnetic head is not pressed to the film;
- a support assembly including a first support member on which said magnetic head is mounted and a second support member on which said first support member is mounted, said second support member being movable toward and away from a plane of said film, and said first support member being movable relative to said second support member along a width direction of said film;
- a reference member mounted on said first support member for movement toward and away from an edge of said film; and
- a drive mechanism for driving said magnetic head between said recording position and said retracted position, said drive mechanism driving said magnetic head from said recording position to said retracted position by moving said first support member in said film width direction to disengage said reference member from said film edge and then moving said second support member in a direction to move said magnetic head away from said film plane, said drive mechanism driving said magnetic head from said retracted position to said recording position by moving said second support member in a direction to press said magnetic head against said film and then moving said first support member in a direction to engage said reference member with said film edge.

10. A recording apparatus adapted to form an image of a field to be photographed on a predetermined plane and expose a film bearing a magnetic recording medium to the image, comprising:

a magnetic head capable of assuming a recording position for recording information on said recording medium while pressed to said film and a retracted position at which the pressing to said film is released; and a drive mechanism for moving said magnetic head between the recording position and the retracted position, said drive mechanism moving said magnetic head in a first direction from said retracted position to a predetermined position at which the magnetic head is pressed to said film, and thereafter moving said magnetic head in a second direction extending along said predetermined plane to said recording position.

* * * * *